(12) United States Patent
Farrington

(10) Patent No.: US 9,950,689 B2
(45) Date of Patent: Apr. 24, 2018

(54) AIRBAG DEVICE FOR A VEHICLE BONNET

(71) Applicant: Jaguar Land Rover Limited, Whitley, Coventry, Warwickshire (GB)

(72) Inventor: Roy Farrington, Whitley (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/908,999

(22) PCT Filed: Jul. 24, 2014

(86) PCT No.: PCT/EP2014/065929
§ 371 (c)(1),
(2) Date: Jan. 29, 2016

(87) PCT Pub. No.: WO2015/014710
PCT Pub. Date: Feb. 5, 2015

(65) Prior Publication Data
US 2016/0200286 A1 Jul. 14, 2016

(30) Foreign Application Priority Data
Jul. 30, 2013 (GB) .................................. 1313627.0

(51) Int. Cl.
*B60R 21/36* (2011.01)
*B60R 21/38* (2011.01)
(Continued)

(52) U.S. Cl.
CPC .............. *B60R 21/36* (2013.01); *B60R 21/38* (2013.01); *B60R 2021/0004* (2013.01); *B60R 2021/21506* (2013.01)

(58) Field of Classification Search
CPC ....... B60R 21/36; B60R 21/38; B60R 21/216; B60R 2021/21506; B60R 2021/2161
See application file for complete search history.

(56) References Cited

U.S. PATENT DOCUMENTS 5,372,379 A * 12/1994 Parker .................. B60R 21/216
165/41
5,447,327 A 9/1995 Jarboe et al.
(Continued)

FOREIGN PATENT DOCUMENTS

CN 2236980 Y 10/1996
CN 1442330 A 9/2003
(Continued)

OTHER PUBLICATIONS

Combined Search and Examination Report corresponding to application No. GB1313627.0, dated Jan. 28, 2014, 10 pages.
(Continued)

*Primary Examiner* — Laura Freedman
(74) *Attorney, Agent, or Firm* — Reising Ethington P.C.

(57) ABSTRACT

An airbag device for installing in a bonnet of a vehicle to manage energy transferred during an impact with a pedestrian. In one aspect, the airbag device comprises a housing containing an airbag and a deployable cover panel, wherein the cover panel includes an outer member coupled to a carrier member, wherein the carrier member is coupled to the airbag housing and configured to separate from the airbag housing upon inflation of the airbag. In another aspect, the airbag device comprises an airbag housing and a cover panel, the cover panel being separable from and tethered to the housing so as to limit displacement of the cover from the housing.

11 Claims, 13 Drawing Sheets

(51) Int. Cl.
    *B60R 21/215* (2011.01)
    *B60R 21/00* (2006.01)

(56) References Cited

U.S. PATENT DOCUMENTS

| | | | | |
|---|---|---|---|---|
| 5,613,701 | A * | 3/1997 | Bentley | B60R 21/215 280/728.2 |
| 6,203,056 | B1 * | 3/2001 | Labrie | B29C 45/14 280/728.3 |
| 6,712,169 | B2 * | 3/2004 | Ryan | B60R 21/36 180/274 |
| 6,719,320 | B2 * | 4/2004 | Gray | B60R 21/216 280/728.3 |
| 6,955,238 | B2 | 10/2005 | Takimoto | |
| 7,143,856 | B2 * | 12/2006 | Takahashi | B60R 21/013 180/271 |
| 7,243,754 | B2 * | 7/2007 | Mori | B60R 21/36 180/274 |
| 7,246,677 | B2 * | 7/2007 | Fredriksson | B60R 21/38 180/274 |
| 7,287,618 | B2 * | 10/2007 | Okamoto | B60R 21/36 180/274 |
| 7,341,274 | B2 * | 3/2008 | Mori | B60R 21/36 180/274 |
| 7,357,212 | B2 * | 4/2008 | Sasaki | B60R 21/36 180/274 |
| 7,422,232 | B2 * | 9/2008 | Cowelchuk | B60R 21/205 280/728.3 |
| 7,484,752 | B2 * | 2/2009 | Yasuda | B29C 65/06 280/728.3 |
| 7,770,684 | B2 * | 8/2010 | Takimoto | B60R 21/36 180/274 |
| 7,913,794 | B2 * | 3/2011 | Takahashi | B60R 21/215 180/274 |
| 8,006,997 | B2 * | 8/2011 | Inoue | B60R 21/216 180/274 |
| 8,657,328 | B2 | 2/2014 | Ory | |
| 9,216,713 | B2 | 12/2015 | Mazanek et al. | |
| 2003/0025305 | A1 * | 2/2003 | Speelman | B60R 21/216 280/728.2 |
| 2005/0206139 | A1 | 9/2005 | Mori et al. | |
| 2007/0228706 | A1 | 10/2007 | Nagae et al. | |
| 2009/0066069 | A1 | 3/2009 | Takahashi et al. | |
| 2010/0156070 | A1 | 6/2010 | Takahashi et al. | |
| 2010/0230944 | A1 | 9/2010 | Narita et al. | |
| 2010/0307854 | A1 | 12/2010 | Mildner | |
| 2014/0318881 | A1 | 10/2014 | Sugimoto et al. | |

FOREIGN PATENT DOCUMENTS

| | | | | |
|---|---|---|---|---|
| CN | 101374703 | A | 2/2009 | |
| CN | 102892639 | A | 1/2013 | |
| EP | 2796327 | A2 | 10/2014 | |
| GB | 2344790 | A | 12/1998 | |
| GB | 2499032 | A | 2/2012 | |
| JP | H07315155 | A | 12/1995 | |
| JP | 2005262955 | A | 9/2005 | |
| JP | 2005343196 | A | 12/2005 | |
| JP | 2006096289 | A | 4/2006 | |
| JP | 2006256447 | A | 9/2006 | |
| JP | 2007196794 | A | 8/2007 | |
| JP | WO 2011162122 | A1 * | 12/2011 | B60R 21/36 |
| WO | 2007085920 | A1 | 8/2007 | |
| WO | WO2013070129 | A1 | 5/2013 | |

OTHER PUBLICATIONS

Combined Search and Examination Report corresponding to application No. GB1413113.0, dated Jan. 22, 2015, 9 pages.
International Search Report and Written Opinion corresponding to International application No. PCT/EP/2014/065929, dated Feb. 13, 2015, 20 pages.
Chinese Office Action in Chinese with English translations for CN application No. 201480042767.9, dated Nov. 1, 2016, 18 pages.
Japanese Office Action in Japanese with English summary for JP application No. 2016-530443, dated Jan. 10, 2017, 4 pages.

* cited by examiner

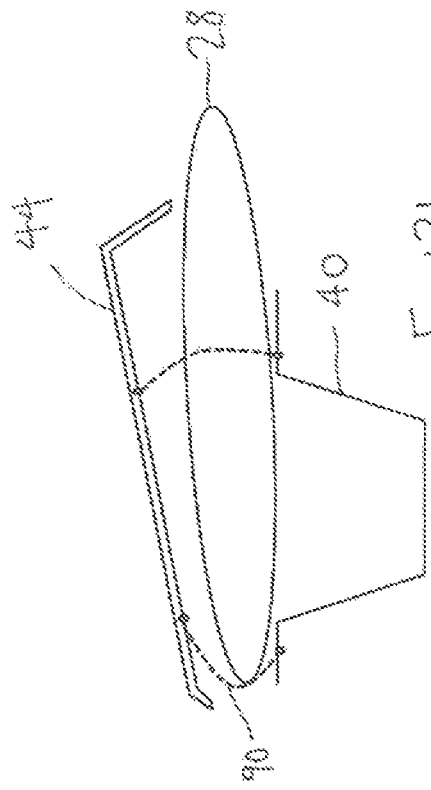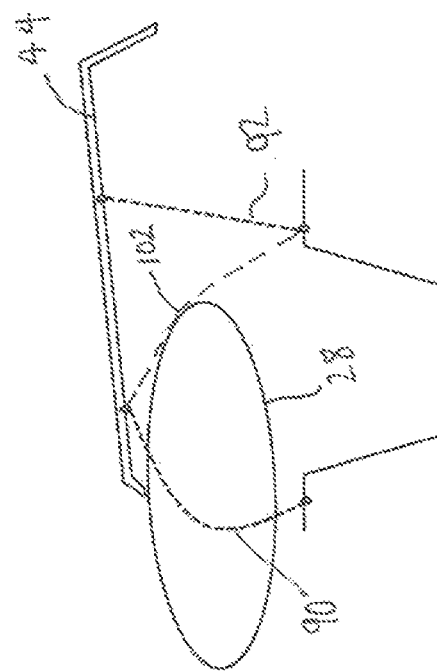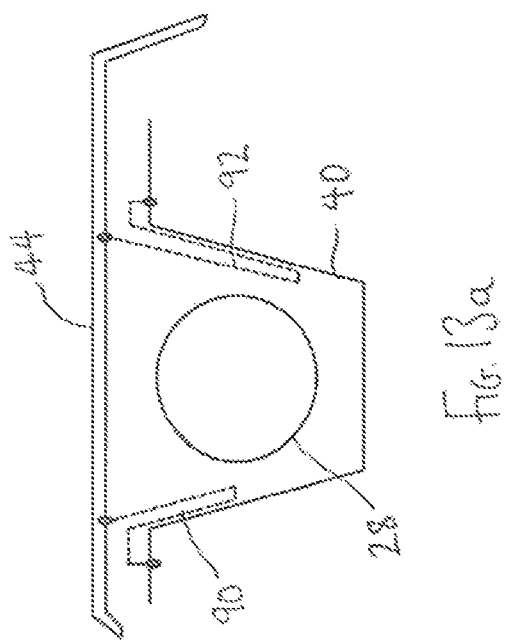

AIRBAG DEVICE FOR A VEHICLE BONNET

TECHNICAL FIELD

This disclosure relates to an airbag device that is installable into a vehicle bonnet in order to provide protection to a pedestrian in an impact. Aspects of the invention relate to an airbag device, a bonnet assembly incorporating an airbag device, and a vehicle.

BACKGROUND

The majority of injuries and fatalities in road traffic related incidents occur to pedestrians. Although traffic regulation and education of pedestrians can achieves some reduction in the number of injuries and fatalities, in more recent years the focus has turned towards vehicle design in order to reduce the likelihood of injury to pedestrians in the event of a collision.

One area of development has been in 'passive' measures involving softening the points of a vehicle that a pedestrian would most likely impact during a collision. Known measures include redesigning bumpers (fenders), bonnets (hoods), windscreens and A-pillars to be more compliant during a collision without compromising the structural integrity of the vehicle, and the passenger cell particularly.

In addition to passive measures, so called 'active' systems have been developed which are able to manage the energy transfer during a collision more effectively. Such active systems include 'pop-up' bonnets in which an actuator deploys an entire bonnet upwardly in a collision. Here, the relatively compliant structure of the bonnet, usually being sheet metal, acts as a cushioning surface for the pedestrian and the raised position of the bonnet provides increased clearance from the engine bay to guard against the pedestrian impacting the harder components in it, such as the engine and suspension parts. A system like this goes some way to improving energy transfer management, although the considerable mass of the bonnet can act as a limitation on deployment speed; generally it is desirable to deploy the bonnet as quickly as possible so the mass of the bonnet compromises the deployment speed.

Other active systems are known. In one example, it is known to incorporate an airbag device in the cowl of the vehicle which deploys from under the bonnet in the event of a collision with a pedestrian. The bonnet also deploys upwardly a short way in this system. The airbag unit in such a device assumes a generally U-shaped configuration when it is fully inflated so the lateral base of the inflated airbag overlies the lower edge of the windscreen whilst the arms of the inflated airbag extend some way up the A-pillars at the sides of the windscreen thereby providing a cushioning surface on these vehicle hardpoints. Although such a system can provide a degree of protection for the pedestrian during impacts with the rear of the bonnet, the windscreen base and the A-pillars, its effectiveness is compromised by the limited space available to store such an airbag device having the necessary volume in the cowl of the vehicle, which is usually in use to store existing components such as air conditioning intakes, and windscreen wiper components. Furthermore, the entire mass of the bonnet must also be deployed which increases the energy consumption of the system and also limits deployment time.

It is against this background that the invention has been devised. Embodiments of the invention may provide an improved airbag device for a vehicle. Other aims and advantages of the invention will become apparent from the following description, claims and drawings.

SUMMARY OF THE INVENTION

According to an aspect of the invention, there is provided an airbag device for installing in a bonnet of a vehicle, the airbag device comprising a housing containing an airbag and a deployable cover panel, and wherein the cover panel includes an outer member coupled to a carrier member, wherein the carrier member is coupled to the airbag housing and configured to separate from the airbag housing upon inflation of the airbag.

In another aspect, the invention resides in a cover panel for an airbag device, the cover panel including an outer member coupled to a carrier member, wherein the carrier member is attachable to a housing of the airbag device and is configured to separate from the housing upon inflation of the airbag device.

Embodiments of the invention therefore combine an airbag with a cover panel that deploys into a position above the airbag thereby providing a further means of protection for a pedestrian during an impact event, and also to protect the bodywork of the vehicle from damage. Being comprised of two components permits the cover member to be optimised for its location on a vehicle: the carrier member can be designed specifically for a structural role in coupling to the airbag housing, whilst the outer member can be optimised, firstly for its visual appearance as part of the outer skin of the vehicle and, secondly, to effectively resist ambient environmental conditions.

Beneficially, an airbag device according to embodiments of the invention may be incorporated into a bonnet and so only the cover panel is deployable, not the entire bonnet as in known systems. The airbag device therefore has less mass involved in deployment, which reduces deployment time. Furthermore, since the airbag device is not stored underneath the bonnet as in known systems, it has an unrestricted volume of deployment above it, which simplifies folding requirements for the airbag, but also may reduce deployment time.

A further benefit is that since the cover panel is visible externally, it can be marked appropriately as an airbag device, which may be a regulatory requirement in some countries to warn of pyrotechnic components to service and emergency personnel and the like.

Beneficially, the outer member may be adhesively bonded to the carrier member which is a last and effective means to join the two-components, and avoids the need for mechanical fasteners such as clips, screws or bolts. The outer member may be bonded to the carrier-member about its perimeter and, in one embodiment, may be bonded by a substantially continuous bead of bonding compound. Such a technique may optimise distribution of forces over the outer member which guards against local build-up of forces under environmental stresses, for example during periods of temperature change, which may otherwise cause undesirable surface quality issues on the visual surface.

For a balance in cost effectiveness, light weight and strength, the outer member and the carrier member may both be polymeric and, in one embodiment may be a suitable resin blend such as Polycarbonate/Acrylonitrile Butadiene Styrene (PC-ABS) which exhibits high impact strength at low temperatures.

The carrier member may incorporate a strengthening member to act as a torsional spine for the carrier member and this may be made of metal, optionally sheet metal such as aluminium alloy. The strengthening member provides the cover panel with additional rigidity to resist over-flexing when impacted with deployment forces greater than head impact forces, for example when impacted by the deploying airbag.

The airbag device may incorporate a tethering system including one or more tethers attached to the cover panel to limit the distance that the cover panel is able to deploy from the housing. Optionally the one or more tethers may be attached to the carrier member of the cover panel. The tethers may be located at associated trailing edges of the cover panel and housing. However, for more certainty in the positioning of the cover panel when deployed, one or more tethers may be provided at or towards the leading edges of the cover panel and housing. The cover panel may be tethered at one or more locations along the leading edge of the cover panel to the housing at one or more locations along the trailing edge of the housing by one or more respective tethers. Alternatively, or in addition, the cover panel may be tethered at one or more locations along the trailing edge of the cover panel to the housing at one or more locations along the leading edge of the housing by one or more respective tethers.

The lengths of the one or more tethers may be selected to control the attitude of the cover panel when it is deployed. In one embodiment, the lengths of the one or more tethers along the leading edge are less than the lengths of the one or more tethers along the trailing edge which orients the cover panel with a forward-facing tilt in the deployed condition. Configuring the rear tethers such that they are shorter than the front tethers would, conversely, provide the cover member with a rear-facing if in the deployed condition which may be desirable in some circumstances.

To control the time of deployment of the cover panel, it may be coupled to the housing by one or more fasteners configured to break under a predetermined tension load during deployment of the airbag. In one embodiment, the one or more fasteners are heat stakes the dimensions of which are selected such that they break under a predetermined tension load during deployment of the airbag.

In another aspect, the invention resides in an airbag device for installing in a bonnet of a vehicle, the airbag device comprising an airbag housing and a cover panel. The cover panel is separable from and is tethered to the housing so as to limit displacement of the cover from the housing. Beneficially, therefore, the airbag device is a standalone unit separate from the bonnet assembly that can be assembled into the bonnet during a manufacturing process of the vehicle. Since it is a standalone unit, the airbag device can readily be removed from the bonnet assembly if a fault occurs such that the device needs replacement. Also, following a collision event, the airbag device can easily be exchanged for a new one and the bonnet assembly can be left in place on the vehicle, provided it remains undamaged.

The tethering of the cover panel to the housing controls the maximum displacement and orientation of the cover panel during deployment. The cover panel may be tethered to the housing at one or more locations along the leading edge by one or more respective tethers, and also may be tethered to the housing at one or more locations along the trailing edge. The cover panel may be tethered at one or more locations along the leading edge of the cover panel to the housing at one or more locations along the trailing edge of the housing by one or more respective tethers. Alternatively, or in addition, the cover panel may be tethered at one or more locations along the trailing edge of the cover panel to the housing at one or more locations along the leading edge of the housing by one or more respective tethers. The lengths of the tethers may be configured to select the orientation of the cover panel when it is deployed. In one embodiment, for example, the lengths of the one or mere tethers along the leading edge are less than the lengths of the one or more tethers along the trailing edge which inclines the cover panel forwardly when deployed.

In another aspect, the invention resides in a vehicle bonnet assembly having a panel defining an aperture within which is mounted an airbag device as described above.

A laterally-extending spar may be provided in the bonnet assembly, optionally adjacent the aperture, to strengthen the bonnet assembly against torsional forces.

When the airbag device is deployed, the cover panel may adopt a position in which it overlies at least a portion of the inflated airbag. Such a configuration increases the coverage of the airbag device when in a deployed condition.

In one embodiment, the airbag includes a central airbag portion intermediate first and second outer airbag portions in the deployed condition the first and second outer airbag portions extend onto respective A-pillars of an associated vehicle and the central portion substantially covers a cowl section of the associated vehicle located behind the bonnet assembly. The airbag must be compacted in order to be packaged into the airbag housing and, to this end, the central airbag portion may be configured into a rolled and folded formation to optimise space efficiency.

In order for the airbag to fit around the tethering system, the airbag may include one or more channels corresponding to the one or more tethers such that when the airbag is in the deployed condition the one or more channels accommodate a respective one of the one or more tethers. The channels may be defined at a junction between a central airbag portion and first and second outer airbag portions.

Thus, in another aspect the invention resides in an airbag for an airbag device comprising an airbag housing and a cover panel, for installing in the bonnet of a vehicle, the cover panel being separable from and tethered to the housing via one or more tethers so as to limit displacement of the cover from the housing, wherein the airbag includes one or more channels, passages or recessed zones corresponding to the one or more tethers such that when the airbag is in the deployed condition the one or more channels, passages, or recessed zones accommodate a respective one of the one or more tethers.

In a further aspect, the invention resides in an airbag for an airbag arrangement wherein the airbag may assume a folded condition and an unfolded condition, wherein in the folded condition the airbag includes one or more channels, passages or recessed zones that serve to accommodate a respective one or more tethers of the airbag arrangement.

It should be noted that various optional features of the first aspect of the invention may be incorporated into the second aspect of the invention, and vice versa.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

One or more embodiments of the invention will now be described, by way of example only, with reference to the accompanying drawings, in which:

FIG. 13a is a schematic section view of the airbag device in an undeployed condition for comparison with FIGS. 13b and 13c which show the airbag device in alternate deployed conditions, respectively.

DETAILED DESCRIPTION

Figure 1:
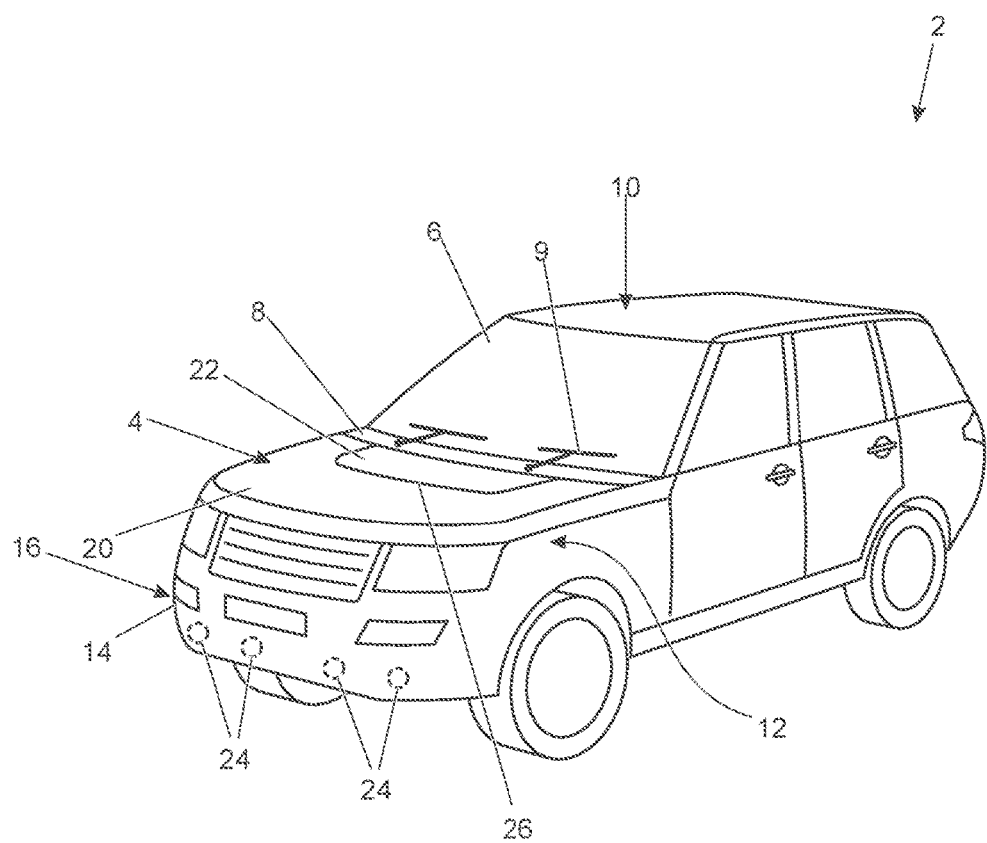
FIG. 1 is a perspective view of a vehicle incorporating a bonnet assembly having a pedestrian airbag device in an undeployed condition.
Figure 2:
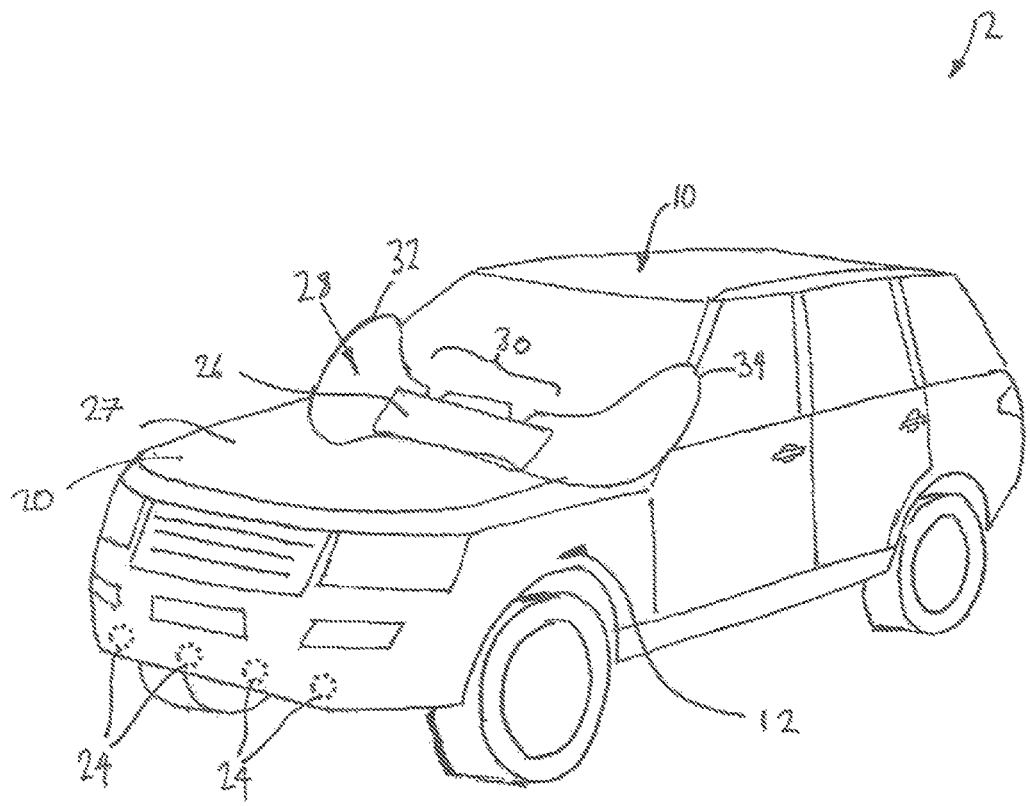
FIG. 2 is a view of the vehicle in FIG. 1 showing the airbag device in a deployed condition.

With reference to FIGS. 1 and 2, a passenger vehicle 2 in the form of a sports utility vehicle or 'SUV' comprises a bonnet assembly 4 and a windscreen 6 rearward of the bonnet assembly 6 and separated from it by a cowl 8. Due to its position below the windscreen 6, the cowl 8 accommodates suitable wiper motors and associated mechanisms to operate a set of windscreen wipers 3. In the usual manner, the bonnet assembly 4 is located in front of a passenger cabin 10 of the vehicle 2 and covers a compartment 12 which serves as an engine bay in this particular vehicle, also housing suspension components and the like. However, if should be noted that in some vehicles, particularly rear- or mid-engine vehicles, a front compartment like this will not be an engine bay and may instead be a storage compartment for luggage or a spare wheel for example. At the front of the vehicle 2 there is provided a bumper or fender 14 which defines a leading edge or surface 16 of the vehicle.

The bonnet assembly 4 includes both passive and active measures to manage a collision with a pedestrian. More specifically the bonnet assembly is partitioned into a first, relatively large, impact zone 20 and a second, relatively small, impact zone 22.

The first impact zone 20 incorporates passive measures for managing the energy imparted it during a collision with a pedestrian, such as suitable strength profiling, deformable regions, absorbing material and sacrificial volumes to optimise energy management as would be familiar to the skilled person. Since the first zone incorporates such passive measures, it will from now on be referred to as the passive impact zone 20.

The second impact zone 22 incorporates active measures for managing the energy imparted to it during a collision, as will be described further. From now on, the second impact zone 22 will be referred to as the active impact zone 22.

The bumper 14 of the vehicle houses one or more collision sensors 24 and these sensors are integrated into a suitable control system (not shown) to control activation of the active impact zone 22.

FIG. 2 shows the active impact zone 22 in a deployed condition. The active impact zone 22 comprises a movable panel 28 that is separable from the remainder of the bonnet assembly 4 in circumstances when the control system determines that pre-set activating conditions have been met. Here, it can be seen that the movable panel 26 of the active impact zone 22 has deployed upwardly from the surrounding upper surface 27 of the bonnet assembly 4 and that an airbag 28 has deployed from underneath the cover panel 26. The airbag 28 may be deployed pyrotechnically by an inflator unit (not shown in FIGS. 1 and 2) that is interfaced to the control system of the vehicle and forms part of an airbag device that will be described in more detail later.

The airbag 28 is generally U-shaped in form and defines a central airbag portion 30 extending laterally across the bonnet assembly 4 in a width direction and first and second outer airbag portions 32, 34 that are larger than the central airbag portion 30 so as to extend up onto the side A-pillars of the vehicle 2.

Since the movable panel 26 is forced upwards and forwards by the airbag deployment, the movable panes 26 overlies at least a position of the airbag 28. The movable panel 26 therefore serves as an impact surface which a pedestrian may strike in the event of a collision. Advantageously, the movable panel 26 provides a further energy absorption structure that complements the airbag 28. During a collision, a pedestrian impacting the deployed movable panel 26 will cause the panel 26 to deform and flex along its length thereby dissipating some of the kinetic energy of the collision. After the initial impact the kinetic energy of the impact will overcome the inertia of the movable panel 26 and so it will begin to move downwards against the airbag 28, gradually collapsing the airbag as it goes, thereby dissipating more kinetic energy item the impact. Since the movable panel 26 overlies the airbag 28 and serves as an initial energy absorbing structure, the requirements on the airbag are reduced. Therefore, the size of the airbag can be reduced resulting in a reduced deployment time, reduced packaging space, reduced weight through the use of a lower capacity inflator, or increase capacity/inflation speed through a maintained weight. Furthermore, the movable panel may be configured such that in a deployed condition a portion of the panel extends beyond the airbag. Thus provides a larger effective impact area as compared to the sole use of an airbag without such an overlying panel.

Further, although not shown here a tether system holds the cover panel in position and limits its travel away from the bonnet. The cover panel and the tether system help to hold down the airbag into a position on the windscreen, which improves the protection provided to a pedestrian.

Having described the overall configuration of the bonnet assembly 4 and the active impact zone 22 with reference to FIGS. 1 and 2, focus will now turn to the features of an airbag device 36 of the bonnet assembly 4 which provides the active impact zone 22. In this respect, FIGS. 3 to 7 show various views of the airbag device 36 isolated from the bonnet assembly 4. In overview, the airbag device 33 includes three main components or assemblies: an airbag housing 40, an airbag unit 42 and a cover panel 44. It should be noted that airbag unit 42 includes the airbag 28 described above with reference to FIGS. 1 and 3, and that the cover panel 44 constitutes the moveable panel 26.

The airbag housing 40 takes the form of an elongated structure fabricated from sheet metal in this embodiment, primarily for structural rigidity and ease of manufacture although this does not preclude other materials from use. The airbag housing 40 is trough-like in form and so is defined by a generally rectangular trough or channel 46 and a flange 48 that extends about the channel 46. The flange 48 serves as a mounting point for securing the airbag device to the bonnet assembly 4 but also for mounting the cover panel 44 to the housing 40, as will be explained.

Figure 3:
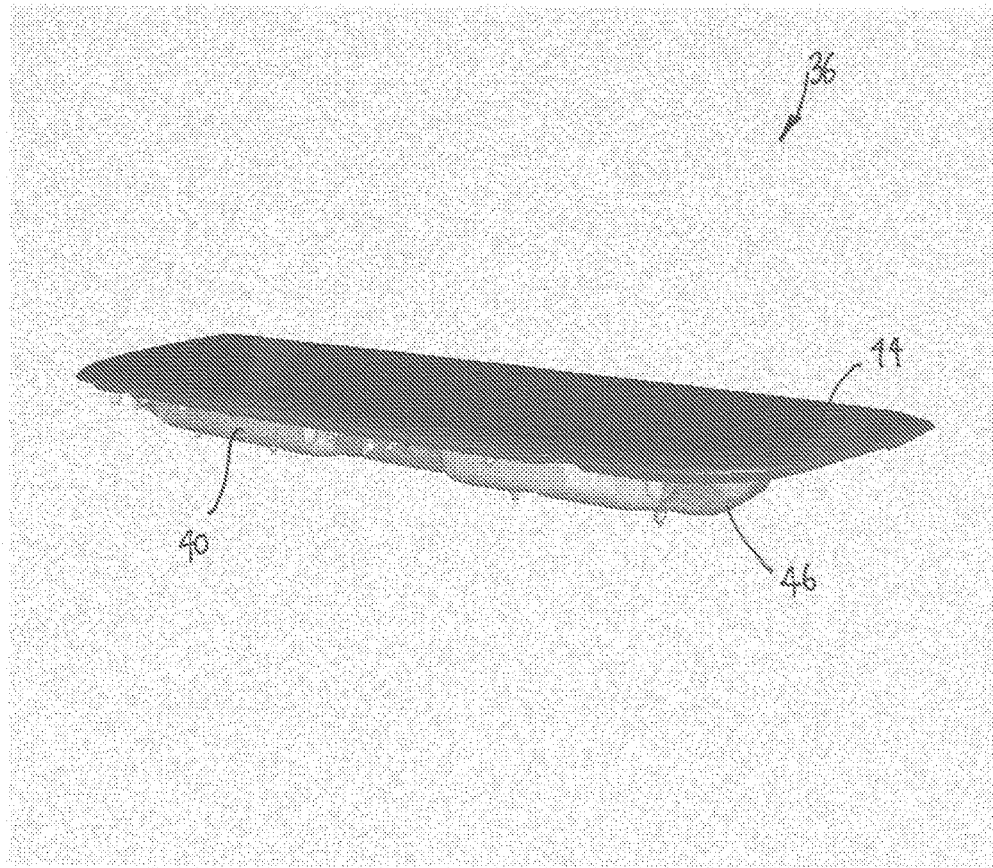
FIG. 3 is a front perspective view of the airbag device in isolation from the vehicle.
Figure 4:
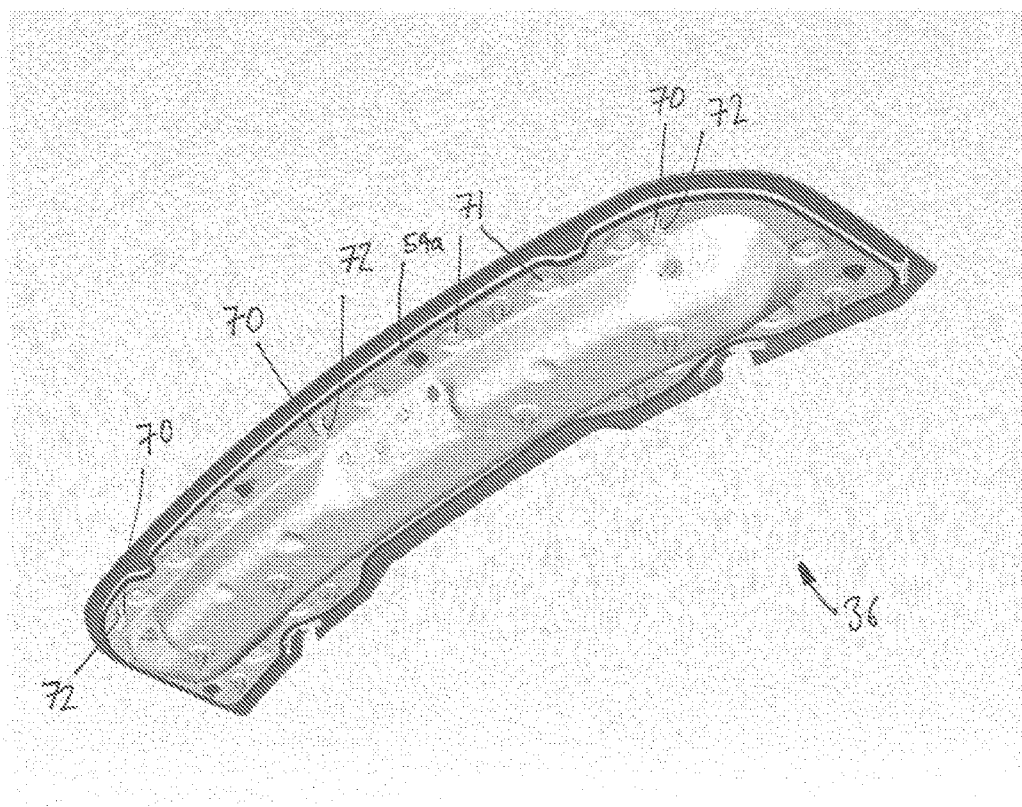
FIG. 4 is a perspective view from underneath of the airbag device in FIG. 3.

The channel 46 is suitably shaped to accommodate the airbag unit 42 fully within it so that the cover panel 44 seals the airbag unit 42 in the channel 46 when the cover panel 44 is attached to the airbag housing 40, as can be seen in FIGS. 3 and 4.

Figure 5:
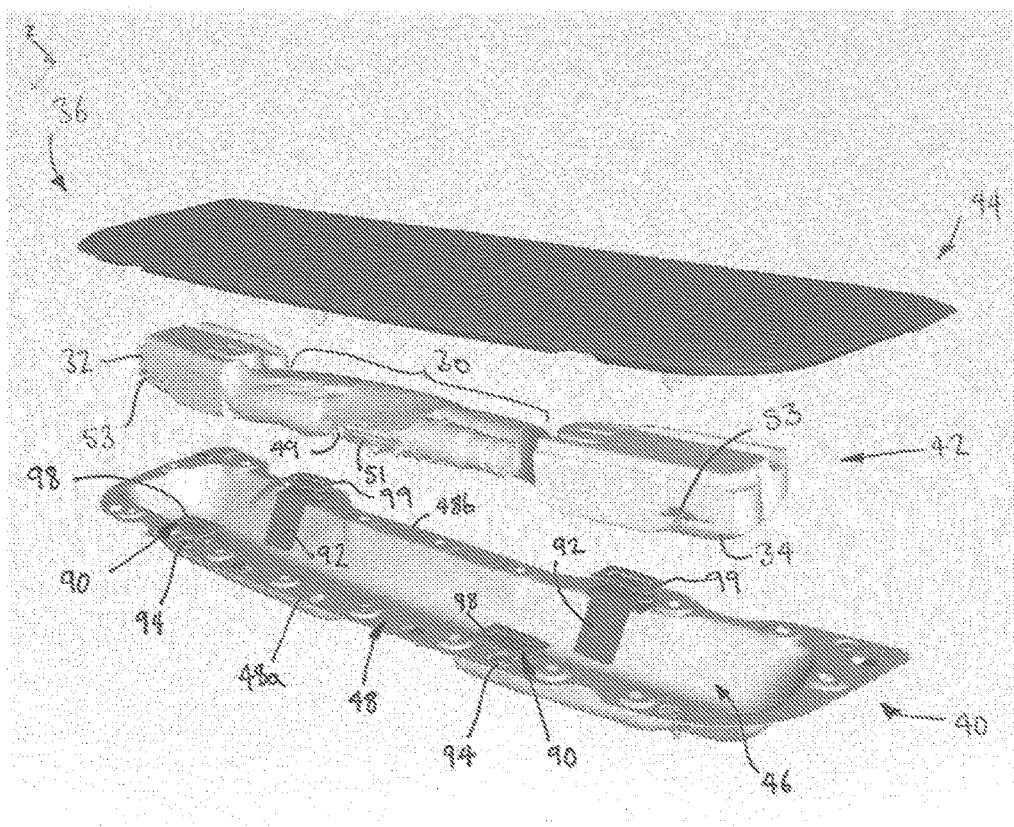
FIG. 5 is a perspective view of the airbag device in FIG. 3 but is exploded to show some of the constituent parts.
Figure 6:
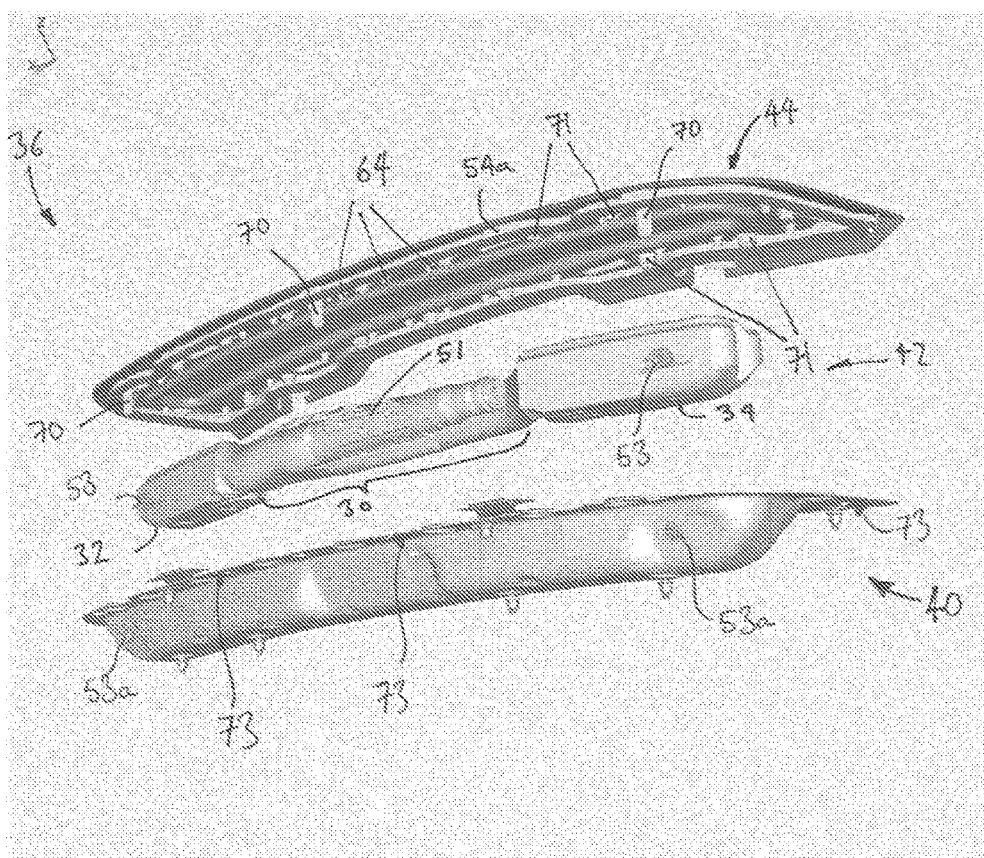
FIG. 6 is an exploded perspective view of the airbag device like that in FIG. 5 but shows an alternative viewing angle.

As perhaps best viewed in FIGS. 5 and 6, the airbag unit 42 is also elongate in form so as to conform generally to the shape of the channel 46. The airbag unit 42 is shown here in its undeployed condition as opposed to the deployed condition as shown in FIG. 2 and, as shown in that Figure, comprises central airbag portion 30 and first and second outer airbag portions 32, 34 either side of the central airbag portion 30. The central airbag portion 30 is in a rolled form and includes an inflator module 50 that feeds into it. The rolled form of the central airbag portion 30 continues into the first and second outer airbag portions 32, 34 which have a larger volume than the central airbag portion 30, when inflated. In order to accommodate the outer airbag portions 32, 34 within the channel 46, they are also folded in a Z-formation. Such a combination of the central airbag portion 30 having a rolled formation and the outer airbag portions 32, 34 having a rolled-and-folded formation enables a relatively high-volume airbag to be housed in a low-volume package of the airbag housing 40. It is envisaged that in a deployed condition the total volume of the airbag will be in the region of 100 to 120 liters, although this should not be considered as limiting. It should be noted that other folding arrangements are possible depending on the required packaging space and the required deployment kinematics for the airbag.

The inflator module 50 also serves as a hardpoint so that the airbag unit 42 may be mounted securely to the airbag housing 40. For this purpose, the inflator module 50 is provided with a mounting bracket 51 that can be mounted to a wall of the airbag housing 40 by suitable mechanical tasters such as bolts 49. The airbag unit 42 is also secured to the airbag housing 40 at buckle points 53 on the outer airbag portions 32, 34. The additional buckle points 53 secure the airbag unit 42 to the airbag housing 40 at widely spaced positioning holes 53a and so complement the central position of the mounting bracket 51 and serve to hold the ends of the airbag unit 42 in position during deployment.

Although not shown in the Figures, it should be noted that the inflator module 50 includes a suitable control interface such as a wiring loom to link the inflator module to the vehicle control system to govern the activation of the inflator module 50.

As has been described, the airbag unit 42 is enclosed in the airbag housing 40 by the cover panel 44 which acts as an external visual surface of the bonnet assembly 4, and also as an energy absorbing structure during a collision with a pedestrian. The cover panel 44 therefore should have a suitable blend of mechanical characteristics to provide it with sufficient rigidity to absorb impacts effectively, to be robust to external environmental conditions and to provide a suitable aesthetic surface for the vehicle in which it is installed. To this end, the cover panel 44 has a multi-part structure as is shown particularly clearly in FIGS. 6 and 7.

In overview, the cover panel 44 comprises an outer member 52, a carrier member 54 and a strengthening member 56. These three components are coupled together to create a suitably rigid, environmentally resilient and aesthetically pleasing outer surface of the airbag device 36.

In this embodiment the outer member 52 and the carrier member 54 are polymeric and the strengthening member is metal. A suitable material for the outer member and the carrier member is PC-ABS due to its high impact strength across a wide range of temperatures, particularly from approximately 85° C. to −30° C., by way of example, although a wider range of temperatures is also envisaged. It is envisaged that the strengthening member is pressed sheet aluminium alloy, chiefly for its cost, strength and weight properties, although other materials such as titanium or steel could also be used.

The carrier member 54 is generally rectangular in shape so as to conform to the plan profile of the outer member 52. However, the carrier member 54 defines an elongated opening 58 as a weight saving measure that is generally in registration with a correspondingly-shaped raised central region 60. The raised central region 60 provides as much volume as possible inside the airbag housing 40 and under the cover panel 44 for the airbag unit 42, and to give stiffness to the strengthening member. The carrier member 54 has a depth such that the raised central region 60 sits within the elongated aperture which further maximises space within the housing 40.

Figure 7:
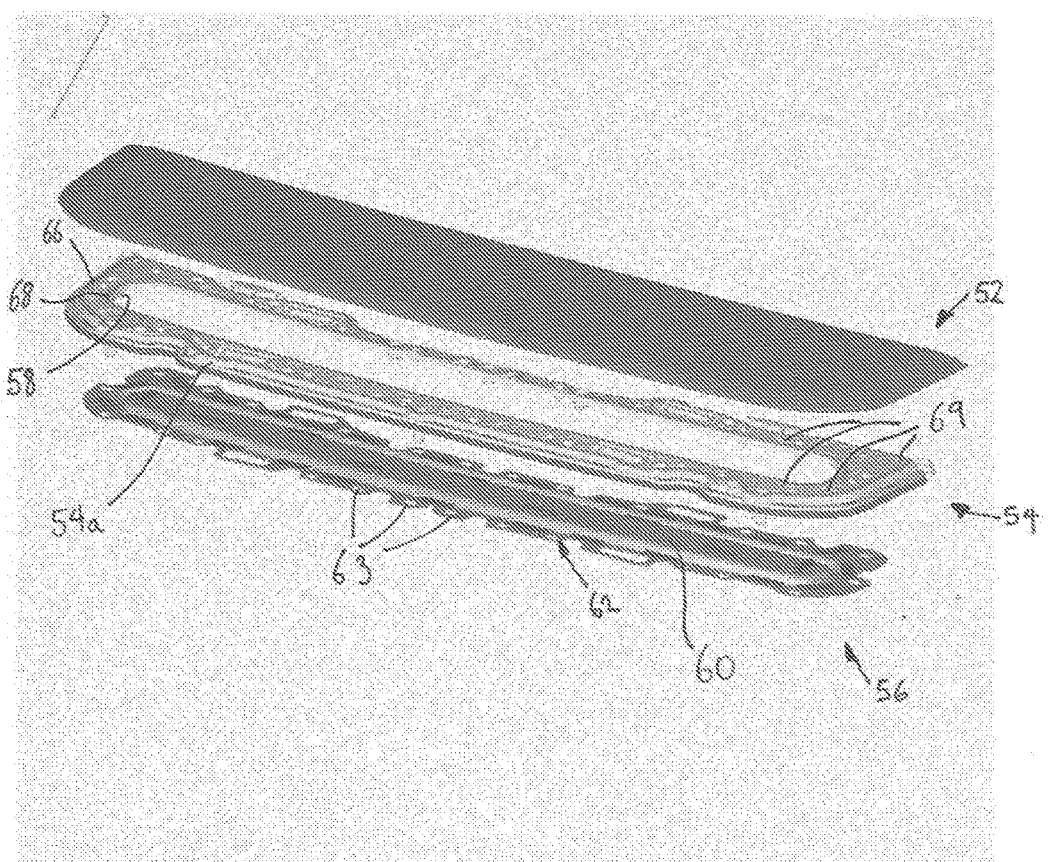
FIG. 7 is a perspective view of a cover panel of the airbag device of FIG. 6, and is exploded to show some of its constituent parts.

The strengthening member 56 has an outer flange region 62 which carries a plurality of mounting points 63 (only some of which are indicated in FIG. 7 for clarity) into which locate respective stakes 64 provided on the underside of the carrier member 54. During manufacture, the stakes 64 are heated locally so that they deform and then cool to secure the strengthening member 56 to the carrier member 54. Alternatively the member 56 may be clipped to the carrier 54.

Whereas 'heat stakes' are used to join the carrier member 64 and the strengthening member 56, in contrast the outer member 52 is adhesively bonded to the carrier member 54 by tending means provided on the upper surface of the carrier member 54. Referring specifically to FIG. 7, the bonding means includes a first bonding track 66 in the form of a substantially continuous bead of adhesive compound that extends about the outer perimeter of the carrier member 54. Similarly, the bonding means includes a second bonding track 68 that is also a substantially continuous bead of adhesive compound but that extends about the perimeter of the elongated opening 58 of the carrier member 54, so is in a radially inner position compared to the first bonding track 66.

The upper surface of the carrier member 54 includes spacer members 69 in the form of ribs or pips 69 to control the spacing of the outer member 52 and therefore to control adhesive thickness. The strengthening member 56 also carries spacer members 65 (also shown in FIG. 10). In the form of ribs that are bonded onto the upper surface of the raised central portion 60 and which butt up against the underside of the outer member 52 as a vibration dampening means. It is to be noted that only some of the spacer members 65, 69 are labeled for clarity. Here, the spacer members 69 of the carrier member 54 are provided on its annular body and so do not extend across the entire width of the carrier member due to its annular shape. However, the spacer members 69 of the carrier member 54 and the spacer members 65 of the strengthening member 56 combine in function to brace the outer member 52, the carrier member 54 and the strengthening member against each other to provide vibration dampening of the entire assembly, strength and packaging space.

Any suitable adhesive could be used such as high strength epoxy but currently envisaged as particularly suited are suitable engineering grade epoxies or a Hot Melt polyurethane reactive adhesive that are able to withstand the impact forces without peeling and also remain bonded across a wide temperature range.

By virtue of the outer and inner bonding tracks 66,68, the outer member 52 is able to be bonded to the carrier member 54 securely and avoids the need for mechanical fastening means such as studs, heat stakes and the like to be provided on the underside of the cover member 54. This ensures that the moulded cover member can be made free from possible surface defects that could otherwise be caused by the integral formation of mechanical fasteners in the outer member. The outer member is therefore suitable to be used as a visual skin of the vehicle without any further surface finishing. Although continuous beads of adhesive have been described here, a plurality of discrete bonding points would also be acceptable, although continuous beads may provide increased robustness particularly in high temperature environments. Providing a substantially continuous bonding bead is thought to provide a large and evenly distributed bonded area which is most likely to meet the high impact and temperature requirements.

In addition to being a mounting structure for the outer member 52, the carrier member 54 also provides mounting means for the cover panel 44 to be fixed to the airbag housing 40. For this purpose the underside of the carrier member 54 is provided with locating posts 70 and a set of mechanical fasteners 71, which are shown most clearly in FIGS. 4, 6 and 10.

In this embodiment, three locating posts 70 depend downwardly from a leading edge 54a of the carrier member 54, although more or fewer could be provided if desired. The locating posts 70 are receivable through respective apertures 72 in the flange 46 of the airbag housing 40 and serve, firstly, to position the carrier member 54 on the housing 40 and, secondly, to provide a locating feature for the housing 40 to be fixed within the bonnet assembly 4, as will be described.

Figure 10:
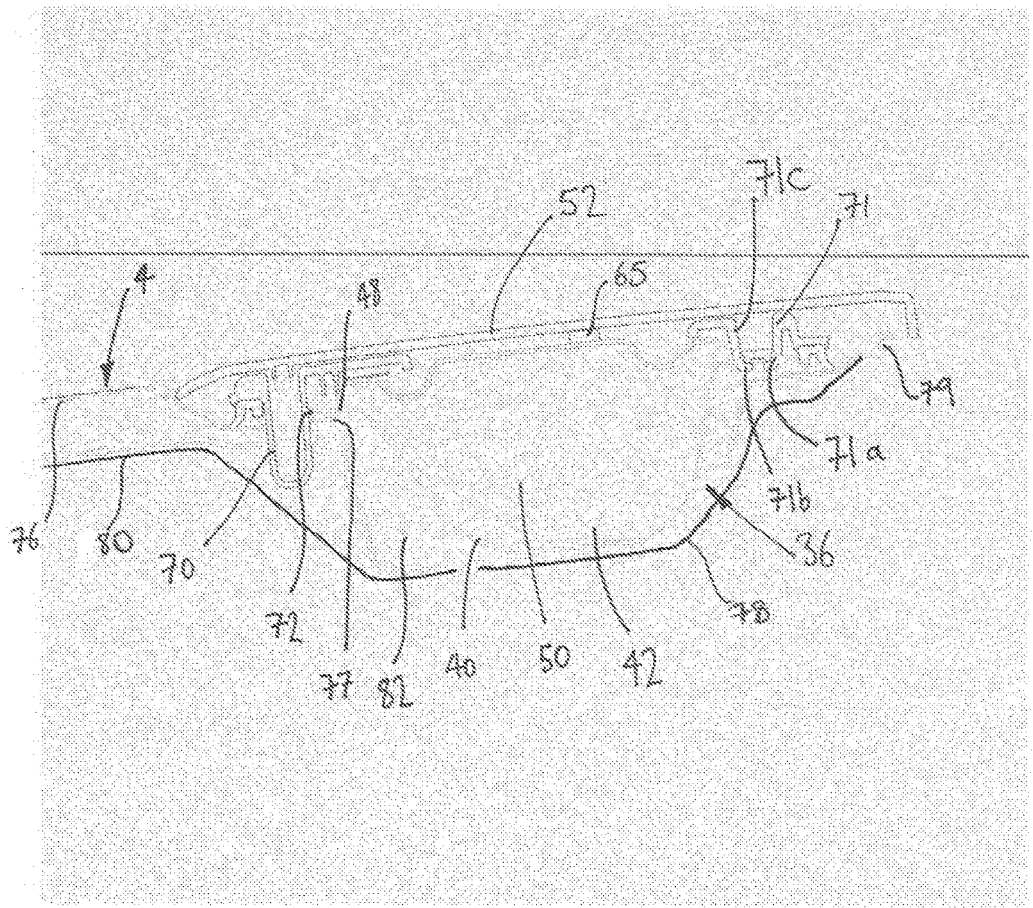
FIGS. 10 and 11 are section views which show the airbag device in situ in the bonnet assembly.

The mechanical fasteners 71 (only some of which are labelled for clarity) are provided at a plurality of positions about the underside of the carrier member 54 and in this embodiment take the form of heat stakes that are an integral part of the moulded body of the carrier member 54. The positioning of the heat stakes 71 relative to the airbag housing 40 is shown in FIG. 10. Here the airbag device 36 is shown in an assembled state such that the heat stakes 71 have been deformed by local heating so as to secure the cover panel 44 to the airbag housing 40. Prior to reaching their assembled state, the heat stakes 71 are elongated bosses that depend from the carrier member 54 and extend through corresponding apertures 71a in the flange 48. At assembly stage the heat stake 71 is undersized so that it fits through the aperture 71a. However, during assembly the heat stake 71 is heated and compressed such that it expands to fit the aperture 71a and forms a head 71b on a base 71c of the heat stake 71, thereby locking the carrier member 54 onto the housing 40. Heat staking is a rapid joining technique and is economical compared to other joining techniques such as welding. However, welding could also be used, as could cold-forming the stakes 71 without the use of local heating. The heat stakes 71 are configured to break during deployment of the airbag unit 42 so that the cover panel 44 separates from the airbag housing 40 and so the wall thickness of the heat stakes is selected accordingly. Here, the need 71b snaps off the base 71c as the junction between the head 71b and the base 71c is a zone of weakness in the heat stakes 71. The zone of weakness may be a function of the material thickness at the junction and is currently envisaged to be approximately 0.5 mm, by way of example. Since the minimum thickness of the stakes 71 can be influenced somewhat by moulding capability, optionally the junction may include perforations which enable deployment force to be tuned appropriately. By way of context, such stakes 71 may require in the region of 800 N to break them.

FIG. 10 also illustrates the position of the locating posts 70 of the carrier member 54 with respect to the airbag housing 40 and also with respect to the bonnet assembly 4. Here it can be seen that the locating post 70 (only one of which is shown in FIG. 10) extends through the flange 48 of the airbag housing 40 and through an outer panel 78 and an inner panel 78 of the bonnet assembly 4. Shown also in this Figure, the underside of the outer member 52 includes low profile pegs 75 that register with the locating posts 70 of the carrier member 54. This helps with positioning the outer member 52 onto the carrier member 64 prior to carrying out the bonding process.

Figure 8:
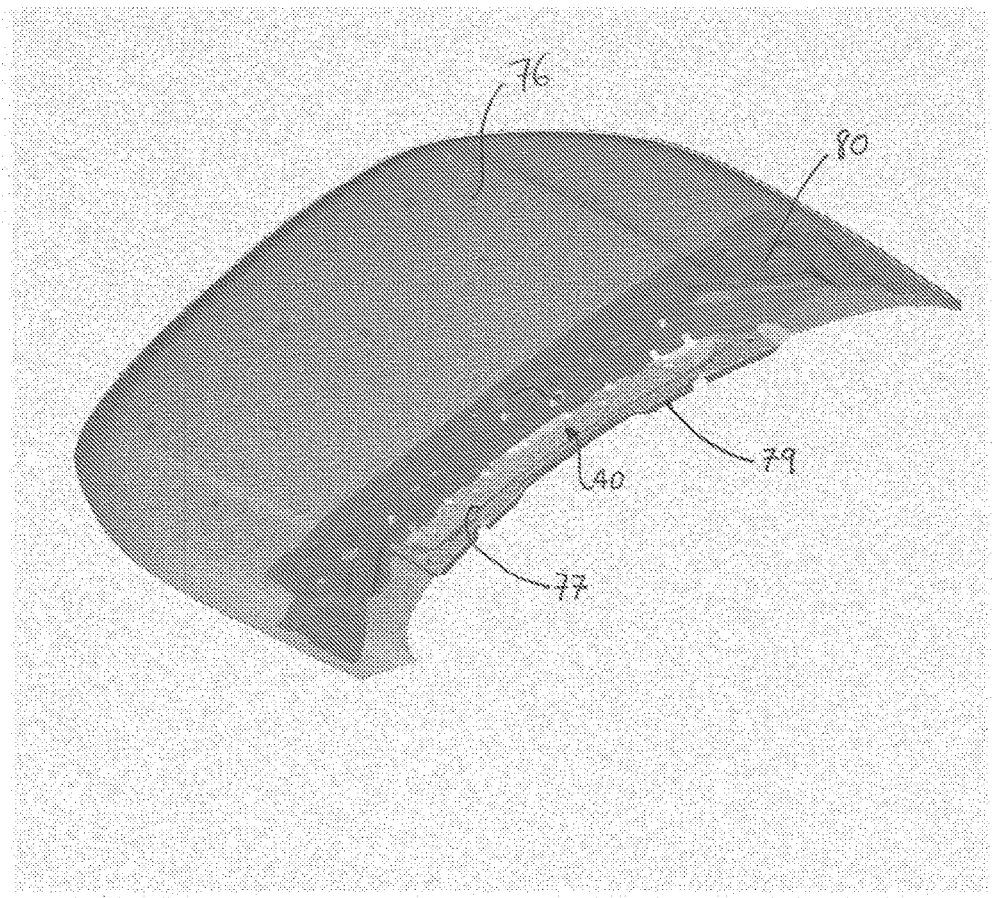
FIG. 8 is an underside view of an upper bonnet panel showing the airbag device installed in it.

During manufacture of the bonnet assembly 4, the airbag housing 40 is mounted in an opening 77 defined adjacent a rear edge 79 of the outer bonnet panel 76, as can be seen also in FIG. 8. Here, the underside of the outer bonnet panel 76 can be seen with the airbag housing 40 located in the opening 77. The locating posts 70 permit the airbag housing 40 to be positioned correctly prior to permanent fixing with suitable mechanical fasteners such as bolts. A series of 'third hand clips' 73 are also provided on the underside of the flange 48 of the airbag housing 40. The clips 73 take the form of pegs or posts having a barbed profile. During installation of the airbag device 36, the clips 73 engage suitable apertures (not shown) provided in the outer bonnet panel 76 and serve to fix the airbag housing 40 temporarily in position prior to it being bolted down permanently. Although not shown here, the locating posts 70 may also be provides with a barbed profile if desired.

As also shown in FIG. 8, bracing means in the form of a lateral spar 80 of pressed metal, for example aluminium or steel, is fixed to the underside of the outer bonnet panel 76 by spot welding or other suitable technique in order to provide increased structural rigidity, thereby reinforcing the panel 76 in the region of the opening 77.

Figure 9:
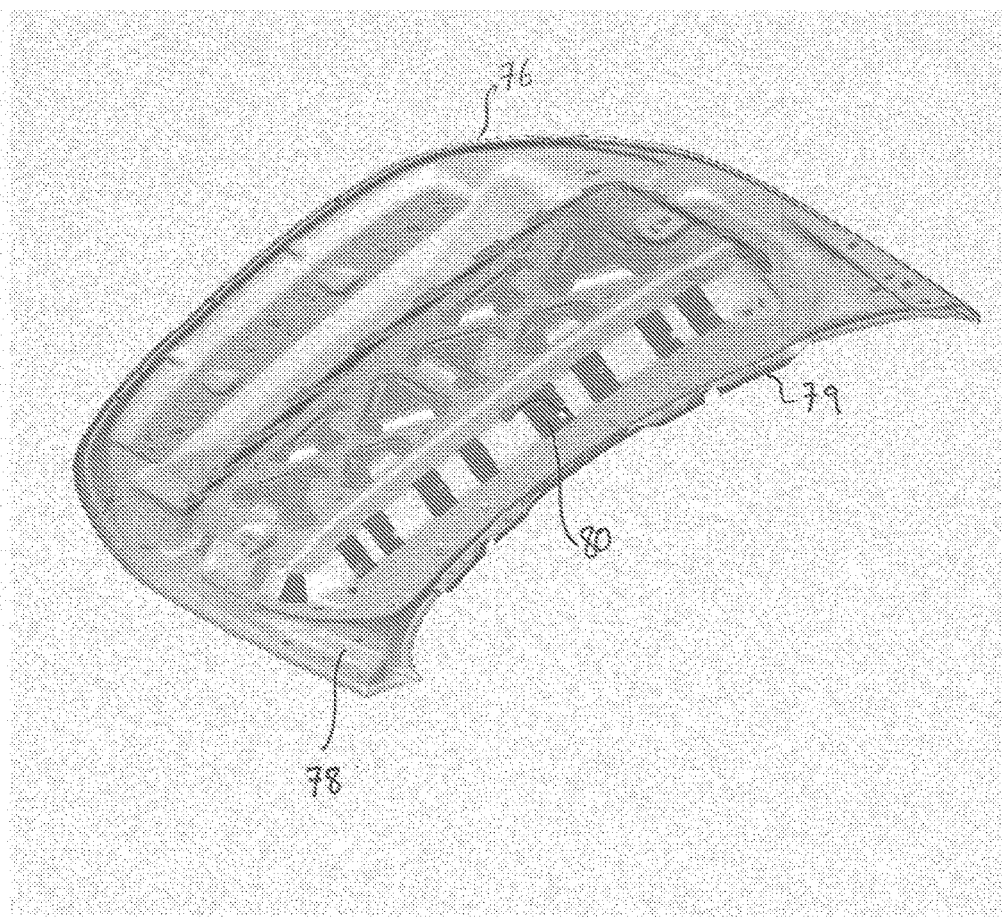
FIG. 9 is an underside view of the upper bonnet panel in FIG. 4, together with a lower bonnet panel.

FIG. 9 shows the underside of the fully assembled bonnet assembly 4 in which the inner bonnet panel 78 has been fixed to the upper bonnet panel 76, thereby enclosing the airbag housing 40 in a cavity defined between the outer and inner bonnet panels, the cavity being illustrated in FIG. 10.

From the above discussion, it will be appreciated that the cover panel 44 is deployable from the airbag housing 40 upon inflation of the airbag unit 42. In order to control the travel of the cover panel 44, the airbag device 36 includes a tethering system, as will now be described with particular reference to FIGS. 5, 11, 12 and 13a-c.

The objective of the tethering system is to control the displacement of the cover panel 44 away from the airbag housing 40 but also to control to orientation of the cover panel 44 so as to present the cover panel 44 in an optimal orientation in readiness for an impact with a pedestrian.

As seen in FIG. 5, the tethering system comprises a set of front tethers 90 and a set of rear tethers 92. Although various materials would be suitable for the tethers, in this embodiment the tethers are sections of flat ribbon-like webbing made from woven nylon or polyester, such as used in airbag fabric. Such webbing material has a very high tensile strength and can be packaged effectively within the airbag housing 40 due to its ribbon-like shape. In principle, however, it should be appreciated that any flexible high-strength material such as cord, rope or chain may be suitable.

Figure 11:
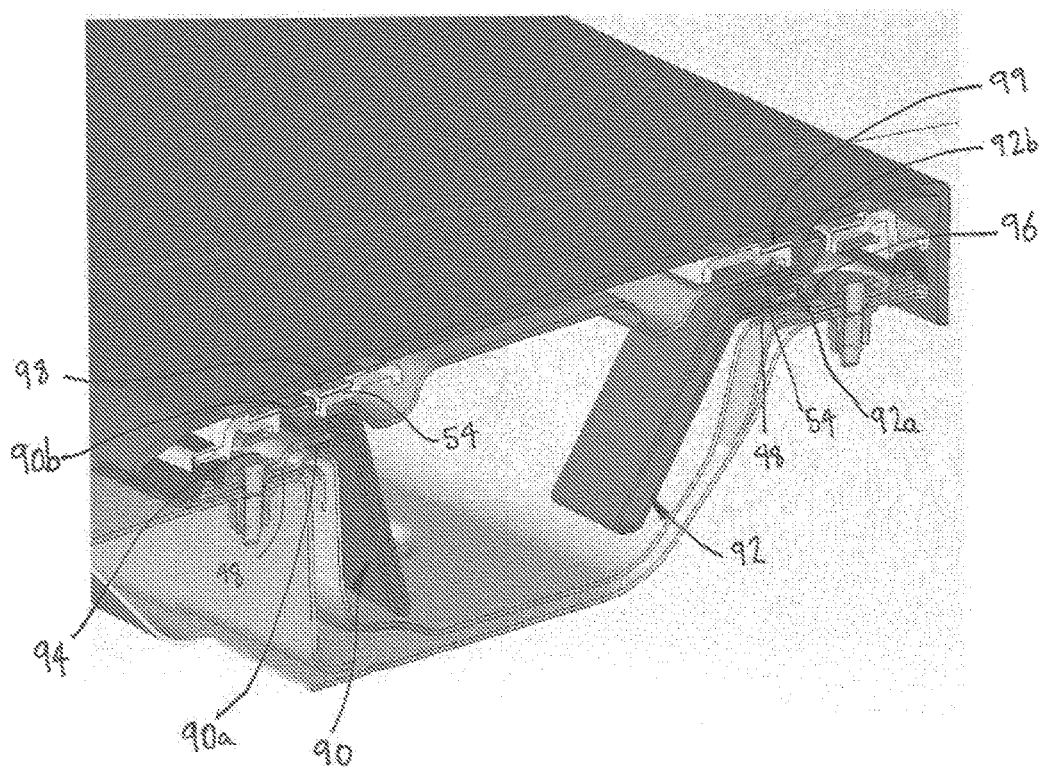

The set of front tethers 90 includes first and second tethers spaced along a leading edge 48a of the flange 48 of the airbag housing 40. Inner ends 90a of each of the front tethers 90 are fixed to the flange 48 at a suitable mechanical anchor point 94 which, in this embodiment, is in the form of a fixing eye through which the tether is securely received. Here, the fixing eye 90a is bolted to the airbag housing 40 as illustrated in FIG. 11.

Outer ends 90b of the front tethers 98 carry attachment means in the form of clasps 98 which are secured in the underside of the carrier member 54 of the cover panel 44. In FIG. 5, the clasps 98 are shown unattached, but FIG. 11 shows the clasps 98 in situ within the carrier member 54.

Similarly, the set of rear tethers 92 includes first and second tethers spaced along a trailing edge 48b of the flange 48 of the airbag housing 40. Again, inner ends 92a of each of the rear tethers 92 are fixed to the flange 48 at suitable mechanical anchor points 96 in the form of fixing eyes in the same way as the front tethers 90, and outer ends 92b of each of the rear tethers 92 carry respective clasps 99 which are secured to the underside of the carrier member 54.

The tethering system therefore supports the cover panel 44 at two points along its front and rear edges. The provision of four tethers in this way, two on each edge, provides support for each quadrant of the cover panel so that its attitude on deployment can be controlled effectively. Two tethers on each edge is currently considered sufficient to provide the cover panel 44 with the required support although more or fewer tethers could be provided if desired, for example if further positional stability is required. The attitude of the coyer panel 44 is determined by selecting the lengths of the tethers. For example, to provide the cover panel 44 with a forwardly-inclined attitude once deployed, the lengths of the front tethers 90 may be selected so that they are shorter than the rear tethers 92.

To help illustrate this, and with reference firstly to FIG. 13a, the cover panel 44 is shown in an unemployed condition with the front and rear tethers 90,92 assuming a slack state accommodated with the airbag housing 40. It should be noted that FIG. 13a shows a section through a vertical plane taken approximately centrally through the airbag housing 40 and the tethers 90, 92 are shown by dashed lines to represent their position out-of-plane. Here, the lengths of the front tethers 90 are shorter than the lengths of the rear tethers 92 and this affects the position of the cover panel 44 relative to the housing 40 and the airbag 42 upon deployment. In this respect, comparing FIG. 13b with FIG. 13a it can be seen that the airbag 28 has been deployed thereby separating the cover panel 44 from the airbag housing 40. The airbag 28 has inflated underneath the cover panel 44 and extends rearwardly of it. The lengths of the front and rear tethers 90,92 constrain the upward movement of the cover panel 44 so that if rests on top of the airbag 28 and the dissimilar lengths of the front and rear tethers 90,92 give the cover panel 44 a forward tilt.

It will be noted that in the section shown in FIG. 13b the rear tethers 92 are shown here as passing through the body of the airbag 28. However, with reference also to FIG. 12, it can be seen that upon inflation of the airbag 28 each of the rear tethers 92 locates in a respective tether channel 100 provided on a rear side of the airbag 28. This ensures, firstly, that the rear tethers 92 do not adversely affect the inflation of the airbag 28 and, secondly, that the inflation of the airbag 28 does not adversely affect the deployment of the cover panel 44. It is noted that the tether channels 100 are defined at the junction between the central airbag portion 30 and the first and second outer airbag portions 32,34 so that the channels 100 are, in effect, defined at junctions between the central airbag portion 30 and the outer airbag portions 32,34.

Figure 12:
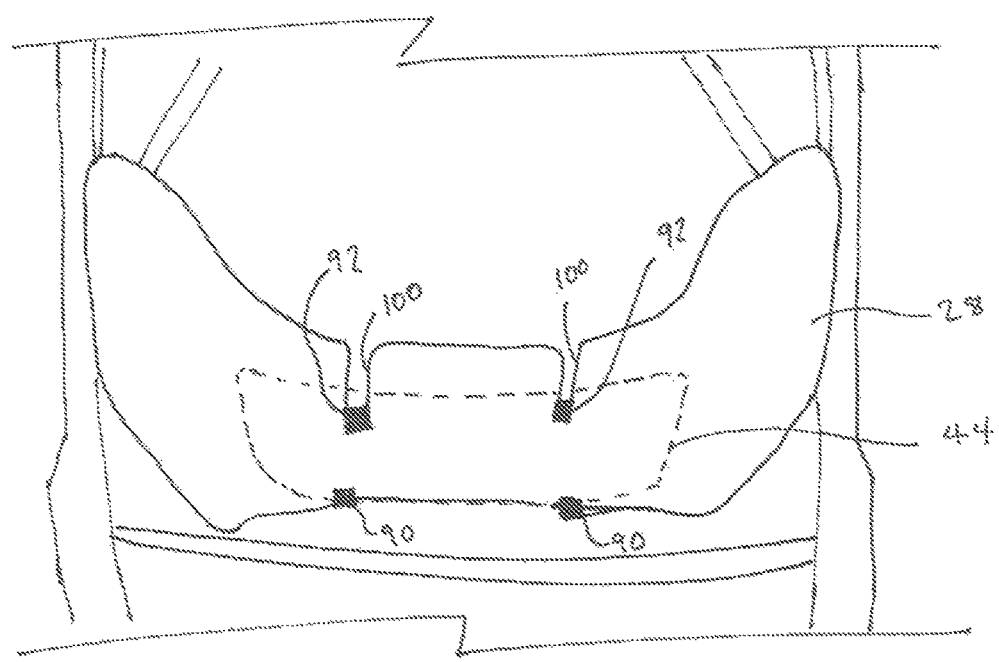
FIG. 12 is view from above of a frontal region of the vehicle in FIGS. 1 and 2 also showing the airbag in a deployed condition.

In the embodiment of FIG. 13b, and as also illustrated in FIG. 12, it can be seen that the cover panel 44 rests substantially on top of the airbag 28. Here, the airbag 28 extends somewhat beyond the rear edge of the cover panel 44 and so provides some protection over the windscreen base of the vehicle.

FIG. 13c shows an alternative positioning of the cover panel 44 and the airbag 28. In this embodiment, the lengths of the front tethers 90 and rear tethers 92 are such that, during deployment of the airbag unit 42, the cover panel 44 is forced upwards and rearward compared to FIG. 13b. The inflated airbag 28 extends somewhat forward of the cover panel 44, whilst the front edge of the cover panel 44 rests on the airbag 28. Advantageously in this embodiment, there is less overlap between the cover panel 44 and the airbag and so a larger protective area is provided by the airbag device 38. The cover panel 44 may also reach a higher position than in FIG. 13b which improves protection, it should further be noted that although not shown in FIG. 13c, the outer airbag portions 32,34 support the central region and rear edge of the cover panel 44. Here, the cover panel is suspended higher than the rounded perimeter of the airbag which improves the protective depth of the area of the cover panel. Optionally, one or more additional rear tethers 102 may be provided that are attached towards the front edge of the cover panel 44. During deployment, the airbag 28 will push against the additional tethers 102 which urge the cover panel 44 in a rearward direction. Depending on the tether arrangement the tether channel 100 may be used on the front side of the airbag as illustrated in FIG. 13c.

However, in circumstances where it is impractical to configure a tether channel into the front part of the airbag, the front tethers could be made longer so as to stretch around the front of the airbag, or the front tethers could be omitted, relying instead on the rear tethers to provide stability to the front and rear edges of the cover panel.

Although tethers in the form of straps have been described as a means of attaching the cover panel to the airbag housing during deployment, an alternative means (not shown in the Figures) to control relative position of cover panel to the airbag would be to attach the cover panel directly to a part of the airbag.

This description has discussed various embodiments of the airbag device 36. The skilled person would understand that the embodiments disclosed are merely examples of the way in which certain aspects of the invention can be implemented and do not represent an exhaustive description of all the ways in which the invention can be embodied. Also, the Figures are not necessarily to scale and some features may be exaggerated or minimised to draw attention to particular components. Well-known components, materials or methods are not necessarily described in great detail in order to avoid obscuring the embodiments described. For the avoidance of doubt. It should be noted that structural and functional details described should not be interpreted as limiting, but rather to provide a basis for the claims. Furthermore if should be noted that terms such as 'front', 'rear', 'up', 'down', 'upper', 'lower', 'outer', 'inner' and the like are used in context with the orientation of the drawings and these terms are not to be considered as limiting the scope of the inventive concept.

The invention claimed is:

1. An airbag device configured to be installed in a bonnet of a vehicle, the airbag device comprising a housing containing an airbag and a deployable cover panel, the cover panel including an outer member coupled to a carrier member, an upper surface of the carrier member including a plurality of spacer members to control a spacing between said upper surface and an underside of the outer member, wherein the carrier member is coupled to the airbag housing and configured to separate from the airbag housing upon inflation of the airbag upon inflation of the airbag, and further wherein the outer member of the cover panel forms part of an outer surface of the bonnet.

2. The airbag device of claim 1, wherein the outer member is adhesively bonded to the carrier member.

3. The airbag device of claim 2, wherein the outer member is adhesively bonded to the carrier member about its perimeter.

4. The airbag device of claim 3, wherein the outer member is adhesively bonded to the carrier member about its perimeter by a substantially continuous bead of bonding compound.

5. The airbag device of claim 1, wherein the carrier member includes a strengthening member attached thereto.

6. The airbag device of claim 5, wherein the strengthening member is metal.

7. The airbag device of claim 1, wherein the cover panel is coupled to the housing by one or more fasteners configured to break under a predetermined tension load during deployment of the airbag.

8. The airbag device of claim 7, wherein the one or more fasteners are heat stakes, the dimensions of which are selected such that the one or more heat stakes break under a predetermined tension load during deployment of the airbag.

9. A vehicle bonnet assembly having a panel defining an aperture within which is mounted an airbag device as claimed in claim 1.

10. A vehicle incorporating an airbag device in accordance with claim 1.

11. The airbag device of claim 1, wherein the carrier member comprises an underside including one or more locating posts for positioning the carrier member on the housing.

* * * * *